April 25, 1967     C. PASSAGGIO     3,315,702
MULTI-WAY VALVE HAVING ROTATABLE PORT SECTIONS
Filed April 2, 1964     2 Sheets-Sheet 1
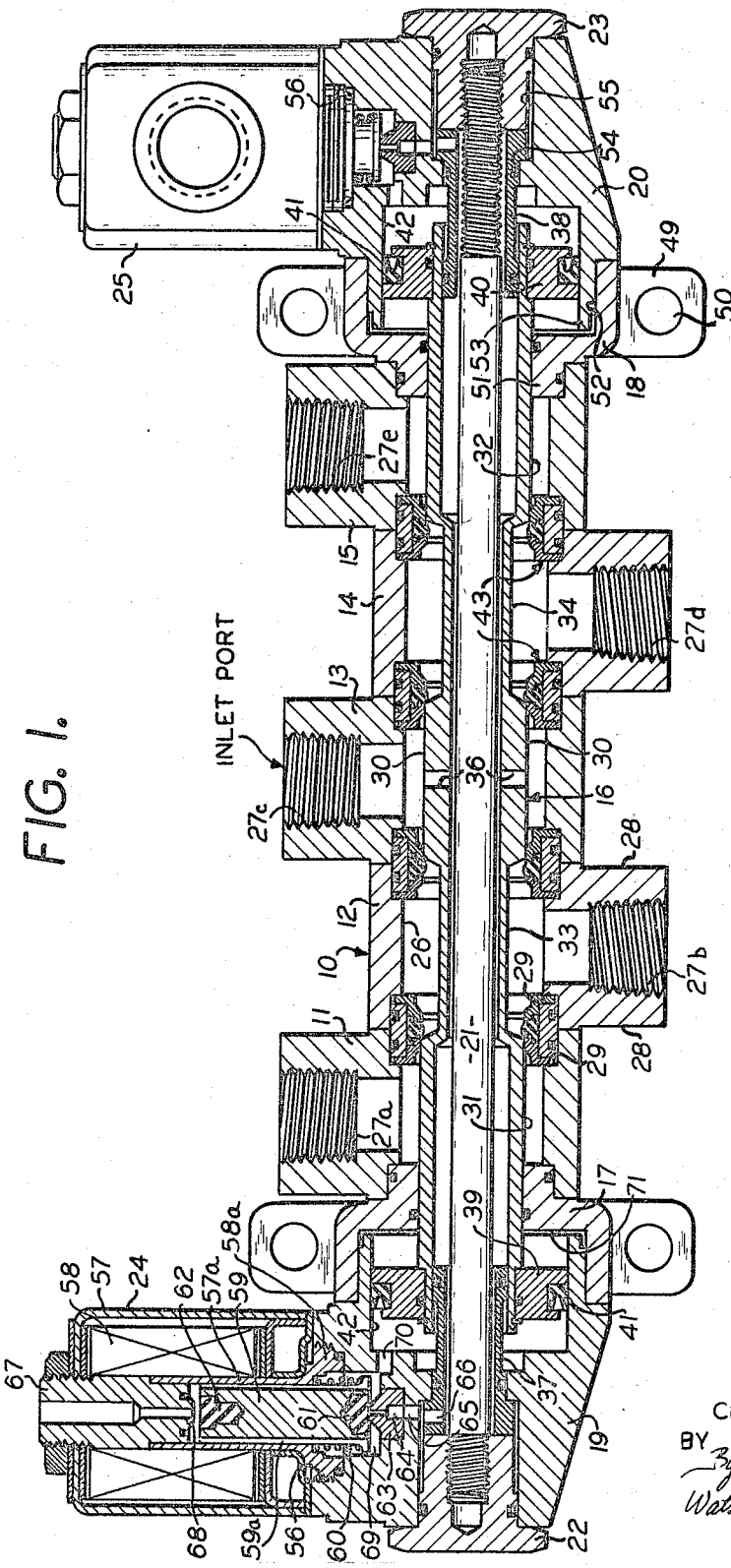
INVENTOR
CHARLES PASSAGGIO
BY Byerly, Townsend,
Watson & Churchill
ATTORNEYS.

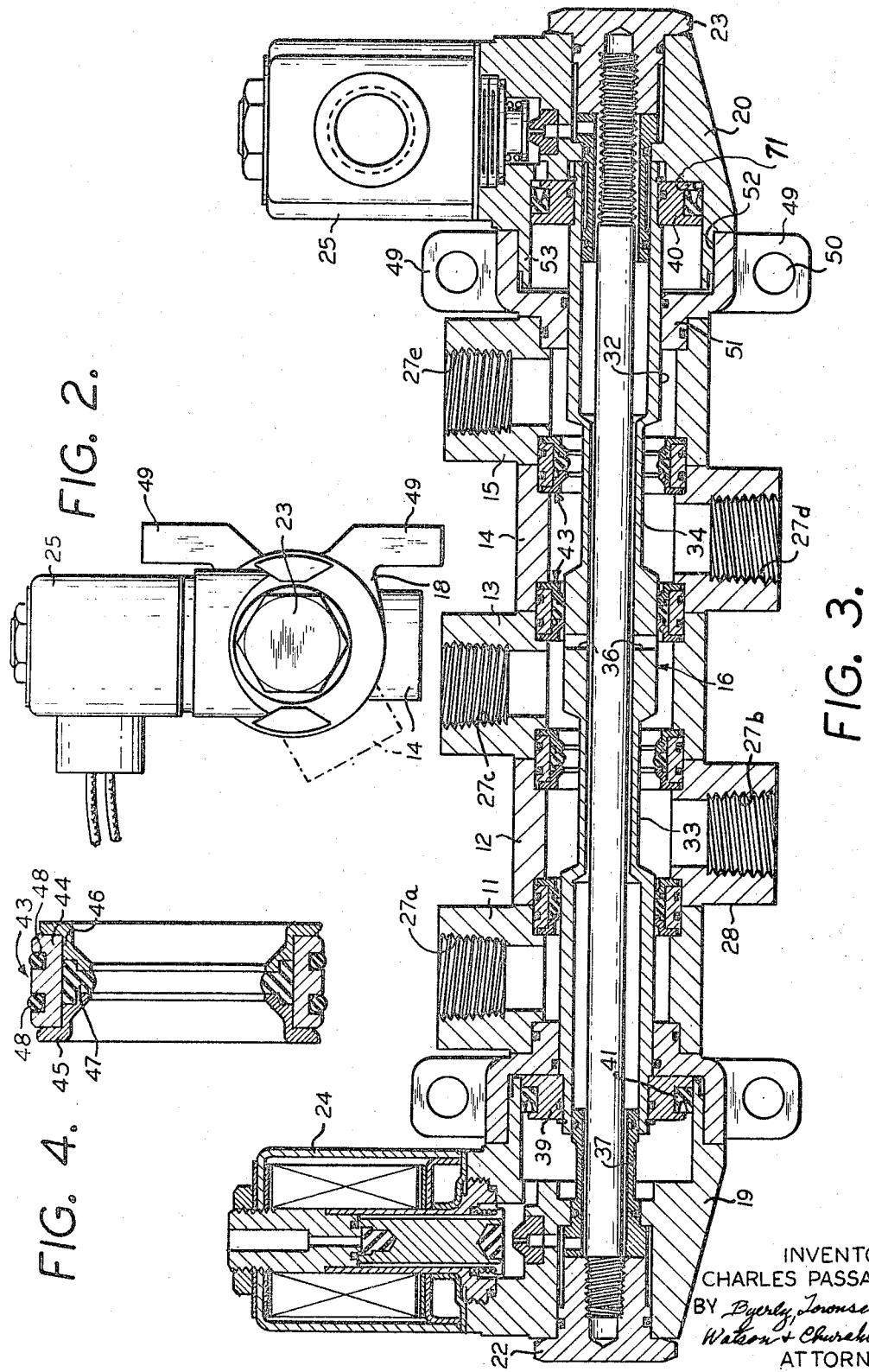

United States Patent Office 3,315,702
Patented Apr. 25, 1967

3,315,702
MULTI-WAY VALVE HAVING ROTATABLE
PORT SECTIONS
Charles Passaggio, Dumont, N.J., assignor to Scovill
Manufacturing Company, Waterbury, Conn., a corporation of Connecticut
Filed Apr. 2, 1964, Ser. No. 356,890
2 Claims. (Cl. 137—625.64)

The present invention relates to multi-way fluid control valves and aims to provide certain improvements therein. More particularly, it relates to such valves formed of a plurality of axially alined assembled body sections, each comprising at least one pipe connection and wherein said sections are rotatably adjustable relatively to one another so that said pipe connections may be brought to convenient installation position for attachment of pipes thereto for conducting fluid to and from the valve.

An object of the present invention is to provide a multi-way control valve in which all of the rotatable body sections are identical in form and may be assembled to provide a two, three or more-way valve body in which the pipe connections may all be alined in one plane or disposed angularly in relation to one another.

A further object of the invention is to provide a valve of the type set forth wherein the angularity between the body sections may be changed without dismantling the valve.

A still further object of the invention is to provide a valve of the type set forth wherein a change in the direction of flow of fluid through the valve can be quickly accomplished by manual, fluid operable, mechanical or electrical means.

A still further object of the invention is to provide a valve of the type set forth having stationary sealing assemblies, the sealing elements of which are so shaped and held in place to prevent roll and pop-out thereof due to unbalanced fluid forces and valve movement.

The foregoing and other objects of the invention, not specifically enumerated, are accomplished by providing a multi-way valve comprising a plurality of identical port blocks, or body sections, a hollow spool valve member movable within said body sections, sealing assemblies mounted between adjacent body sections and containing stationary sealing elements for engaging the spool valve, holding means including a tie rod extending through the spool valve for retaining the body sections and the sealing assemblies in assembled relation and for angularly adjusting said sections relatively to each other through 360°, and means for moving the spool valve member within the body sections to control the direction of flow of fluid through the ports thereof. The invention also resides in novel assemblies and combinations of parts, all of which will be better understood from the detailed description which follows when considered in connection with the accompanying drawing wherein:

FIG. 1 is an axial section through a multi-way valve embodying the invention and showing the pipe attachments on adjacent port blocks disposed 180° apart in a plane parallel to the plane of the base mounting for the valve and with the spool valve in closed relation to the inlet port;

FIG. 2 is an end elevation of the valve shown in FIG. 1 as viewed from the right hand end thereof;

FIG. 3 is a view similar to FIG. 1 showing the spool valve member in a position moved to the right from that shown in FIG. 1 to provide open communication between the inlet port and the port in the adjacent block to the left of the body section containing the inlet port.

FIG. 4 is a diametrical section through a sealing assembly forming a detail of the invention.

Referring to the drawings, in the various figures of which the same reference numerals are employed to designate corresponding parts, the reference numeral 10 indicates a valve body consisting of a plurality of identical body sections 11, 12, 13, 14 and 15 having alined bores within which is disposed an axially movable, hollow spool valve member 16, the body sections being held in assembled relation between a pair of mounting blocks 17 and 18 which in turn are supported by end blocks 19 and 20, the means for holding the body sections in assembled relation comprising a tie rod 21 and cap nuts 22 and 23, the spool valve being operable by valve operating means herein shown as solenoids 24 and 25.

The body sections 11–15, any desired number of which may be used depending upon the operations to be performed by the fluid controlled by the valve, each consists of a block having a bore 26 therethrough and a screw-threaded port 27a to 27e, respectively, normal to the bore, the block having parallel flat end faces 28, in each of which is formed an annular rabbet 29 opening into the bore 26. The body sections are held in assembled relation with their bores in axial alinement through the agency of the mounting blocks 17 nad 18, the end blocks 19 and 20 and the holding means consisting of the tie rod 21 and cap nuts 22 and 23.

The hollow spool valve member 16 has axially spaced peripheral lands 30, 31 and 32 and peripheral grooves 33 and 34 between said lands, the axial dimension of the peripheral land 30 and the peripheral grooves 33 and 34 are substantially equal to the axial length of a body section. The port 27c in the body section 13, is herein designated the inlet port and the ports in the other body sections to either side of the inlet port are adapted to successively receive fluid pressure from the inlet port and to exhaust such pressure through the other ports after said fluid pressure has performed its intended function. It will be noted that the internal bore of the hollow spool valve member 16 is of larger diameter than the tie rod 21 so as to provide an annular space for fluid flow through the spool for a purpose which will be hereinafter explained. The spool valve member at the land 30 has transverse parts 36 therethrough providing fluid communication between the bore of the spool valve member around the tie rod 21 and the inlet port 27c. The spool valve member 16 is mounted for slidable movement on bearing members 37 and 38 which in turn are supported in the end blocks 19 and 20, respectively. Said spool valve member at its opposite ends has mounted thereon pistons 39 and 40 each of which is provided with a U-ring packing 41, said pistons being slidable in bores 42 in the end blocks 19 and 20. To provide seals between the various movable parts, suitable packing rings are employed to which reference characters have not been applied.

To provide fluid-tight seals between adjacent body sections and to also provide sealing engagement with the lands on the spool valve member 16, sealing assemblies 43 are disposed within annular channels formed by adjacent rabbets 29 and held tightly therein by the tie rod 21 and cap nuts 22 and 23. Each sealing assembly 43 as shown in enlarged cross-section in FIG. 4 consists of a rigid annular outer ring 44 mounted within a pair of opposed rigid lateral rings 45 each having a cylindrical shoulder 46 which is press-fitted into the inner periphery of the outer ring 44. Before such press-fitting operation is performed however, there is disposed between the opposed rings 45 a gland T-ring 47, the inner periphery of which protrudes slightly beyond the inner periphery of the rings 45. The outer ring 44 has mounted in its outer peripheral surface a pair of axially spaced elastic O-rings 48. It will thus be seen that when the sealing assemblies 44 are mounted and held between adjacent body sections, the O-rings 48 seal the interface between adjacent body sections and the gland T-rings are adapted for sliding leak-tight engagement with the lands on the spool valve member 16.

The mounting blocks 17 and 18 are each formed with a pair of opposed foot members 49 each having a perforation 50 therethrough for mounting said blocks on a firm support and with a reduced axial end portion 51, the bore of which provides an additional slide bearing for the spool valve member 16 and the external diameter of which engages within an annular rabbet 29 in an end body section and provides a seal therewith. At its opposite end each mounting block has an enlarged bore 52 which receives a tubular extension 53 on the end blocks 19 and 20.

The end blocks 19 and 20 are each formed with a bore therethrough of different diameters, the bore 42 of which at the inner end of a block provides a cylinder within which a piston 39 or 40 is movable and with bores of appropriate diameters 54 and 55 for accommodating the bearing member 37 or 38 and the cap nut 22 or 23, respectively. Each end block also carriers one of the solenoids 24 and 25 which are screw-threaded into openings 56 in said end blocks.

The solenoids 24 and 25 are of a commercial type known as No. 32003-110 available from Allied Control Co., Inc., Valve Division, New York, N.Y. As shown, each of the solenoids comprises an outer casing 57 having mounted therein a magnetic coil 58 and an inner casing 57a having at its inner end a coupling nut 58a which engages in the screw-threaded opening 56. The inner casing has slidable therein an armature 59 having longitudinal slots 59a therein and which is normally held projected outwardly by a coil spring 60 disposed between shoulders on the nut 58a and on the armature 59. The armature 59 at its opposite ends is provided with deformable valve members 61 and 62, respectively. The valve member 61 is normally held by the spring 60 in seating engagement on a valve seat 63 which has an axial passage 64 therethrough in open communication with a passage 65 in the end block 19 and a passage 66 in the bearing member 37 which is in open communication with the annular space between the bore of the spool valve member 16 and the tie rod 21. Carried by the outer casing 57 and fixedly mounted in the outer end of the casing 57a is a hollow plug 67 formed at its inner end with a valve seat 68 against which the valve 62 is adapted to seat when the solenoid is energized and the armature thereof is drawn inwardly.

The body sections 11-15 with their sealing assemblies 43, the mounting blocks 17 and 18 and the end blocks 19 and 20 are held in assembled relation by tightening the cap nuts 22 and 23 on the threaded ends of the tie rod 21. In view of the opposed parallel flat end faces on the body sections 11-15, it will be apparent that said body sections are adjustable angularly relatively to each other throughout 360° around the axis of the multi-way valve. To make any desired angular adjustments of the body sections relatively to one another, it is merely necessary to temporarily loosen one of the cap nuts 22 or 23 to unclamp the body sections, make the desired adjustments and then retighten such cap nut.

Operation

The relationship of the body sections 11-15 to the hollow spool valve member 16 is shown in FIG. 1 in normal inoperative position of the valve member 16 in which position air under pressure upon entering the inlet port 27c will pass through the ports 36 in the valve member 16 into the annular space between said valve member and the tie rod 21. By virtue of sealing assemblies 43, none of this incoming air will pass to the port in any of the other body sections but on the contrary will be blocked by the gland T-rings on the sealing assemblies 43 flanking the land 34. Now when solenoid 24 is energized, the armature 59 thereof will be drawn inwardly to open the valve 61 and close valve 62 whereupon the air under pressure will pass through the space 69 around valve seat 63, through a port 70 in the end block 19 to the bore 42 in said end block and act upon the piston 39 to move the spool valve member 16 to the right, such movement being stopped by a shoulder 71 in the mounting block 20. In the course of such movement, fluid communication will be established between the inlet port 27c and port 27b as shown in FIG. 3. The air passing through port 27b may be used to activate a piston in an air cylinder or other device (not shown). Upon de-energizing the solenoid 24, the valve 61 will close and the valve 62 will open, whereupon the air trapped in the space to the left of the piston 39 will vent to atmosphere through the slots 59a in the armature 59, the open valve 62 and the hollow plug 67. When it is desired to reverse the operation of the piston within the cylinder last referred to, the solenoid 25 is energized, whereupon the air under pressure entering the inlet port 17c will enter the annular space between the tie rod and the bore of the valve member 16, will act upon piston 40 to move the spool valve to the left and admit air under pressure into the port 27d which may be connected to the opposite side of the piston in the cylinder or other device (not shown). During this phase of operation, the air originally admitted to port 27a will exhaust through port 27b. The next operative cycle will be performed when the solenoid 24 is again energized whereupon the air originally admitted to port 27d will exhaust through port 27e.

It will be appreciated that the direction of flow of fluid through the valve, i.e., by axial movement of the spool valve member 16 may be accomplished by manual, fluid operable, or mechanical means in lieu of the solenoid electrical means hereinbefore described.

While I have shown and described a preferred embodiment of my invention, it is to be understood that changes may be made in details of construction and arrangement of parts within the scope of mechanical and engineering skill without departing from the spirit of the invention as claimed.

What I claim is:

1. A multi-way fluid control valve comprising a body consisting of a plurality of idenitcal axial aligned body sections, each having parallel flat end faces, a bore therethrough and a port leading from said bore and normal thereto, the bores through the body sections being in axial alignment and an axially displaceable hollow spool valve member having axially spaced peripheral lands and grooves movable within the said aligned bores to control the fluid flow through said ports, mounting means at each end of the body, valve operating means supported by each mounting means, resilient means providing fluid-tight seals with adjacent body sections and also sealing engagement with the lands on the valve member, a tie-rod extending through the hollow spool valve member, the mounting means and the valve operating means for releasably clamping said body sections, mounting means, valve operating means and sealing means in assembled relation, the body sections being selectively adjustable around the axis of the bores to position said ports in any angular relation to one another by merely temporarily loosening said tie rod, and wherein the port in one body section is the inlet port and the bore of said body section encircles in spaced relation a part of the spool valve member which has a port open to the inlet port and to the bore of the spool valve member which latter bore is of larger diameter throughout its length than the tie rod extending therethrough, a piston at each end of the spool valve member in fixed encircling relation thereto, a bearing bushing of larger diameter than the tie rod supported in each valve operating means providing slidable sealing engagement for the spool valve member, the valve operating means each having in encircling relation to the bushing a chamber within which one of the pistons is movable for selectively establishing fluid communication between the bore of the spool valve member and one side of a piston to control the movement of the spool valve member.

2. A multi-way valve according to claim 1 wherein the valve operating means for selectively establishing fluid communication between the bore of the spool valve member and a piston includes a solenoid controlled valve.

References Cited by the Examiner

UNITED STATES PATENTS

| | | | |
|---|---|---|---|
| 1,636,632 | 7/1927 | Hansen | 137—625.66 XR |
| 2,747,611 | 5/1956 | Hewitt | 137—625.69 |
| 2,771,907 | 11/1956 | Joy | 137—625.63 XR |
| 2,834,368 | 5/1958 | Gray | 137—271 |
| 2,982,306 | 5/1961 | Fitzgibbon | 137—625.64 |
| 3,199,538 | 8/1965 | Anthon | 137—625.67 XR |
| 3,199,540 | 8/1965 | Forster | 137—625.69 |
| 3,202,170 | 8/1965 | Holbrook | 137—269 |

FOREIGN PATENTS 931,956   7/1964   Great Britain.

M. CARY NELSON, *Primary Examiner.*

HENRY T. KLINKSIEK, *Examiner.*